(12) United States Patent
Barker

(10) Patent No.: US 6,281,883 B1
(45) Date of Patent: Aug. 28, 2001

(54) DATA ENTRY DEVICE

(75) Inventor: Bruce J. Barker, N.Y., NY (US)

(73) Assignee: Voice Domain Technologies, LLC, Fairfax, VA (US)

( * ) Notice: Subject to any disclaimer, the term of this patent is extended or adjusted under 35 U.S.C. 154(b) by 0 days.

(21) Appl. No.: 08/303,128

(22) Filed: Sep. 8, 1994

Related U.S. Application Data

(63) Continuation of application No. 08/029,118, filed on Mar. 10, 1993, now abandoned.

(51) Int. Cl.[7] ................................................ G09G 5/00
(52) U.S. Cl. ........................ 345/169; 345/157; 345/167; 704/275
(58) Field of Search ............................... 340/709, 825.19; 200/5 R; 341/20, 21, 22; 381/41, 42, 43, 44; 367/197, 198, 199; 379/67; 345/161, 162, 163, 167, 156, 158, 203, 169, 157; 395/2.84; 704/275

(56) References Cited

U.S. PATENT DOCUMENTS

| | | | |
|---|---|---|---|
| 3,560,666 | 2/1971 | Bookman | 179/100.11 |
| 4,245,244 * | 1/1981 | Lijewski et al. | 345/161 |
| 4,377,825 | 3/1983 | Kasubuchi et al. | 360/48 |
| 4,426,733 * | 1/1984 | Brenig | 367/198 |
| 4,517,424 * | 5/1985 | Kroczynski | 200/5 R |
| 4,552,360 * | 11/1985 | Bromley et al. | 340/709 |
| 4,562,347 * | 12/1985 | Hovey et al. | 345/167 |
| 4,605,975 | 8/1986 | Beaman | 360/62 |
| 4,739,128 * | 4/1988 | Grisham | 340/709 |
| 4,754,268 * | 6/1988 | Mori | 345/158 |
| 4,758,913 | 7/1988 | Saltzman et al. | 360/72.1 |
| 4,989,253 * | 1/1991 | Liang et al. | 367/198 |
| 5,033,077 * | 7/1991 | Bergeron et al. | 379/67 |
| 5,036,539 * | 7/1991 | Wrench, Jr. et al. | 381/43 |
| 5,045,327 | 9/1991 | Tarlow et al. | 381/51 |
| 5,157,384 * | 10/1992 | Grenias et al. | 345/156 |
| 5,161,199 | 11/1992 | David | 381/51 |
| 5,287,119 * | 2/1994 | Drumm | 340/825.19 |
| 5,319,620 | 6/1994 | Hohenbuchler et al. | 369/29 |
| 5,339,095 * | 8/1994 | Redford | 345/169 |
| 5,347,630 * | 9/1994 | Ishizawa et al. | 345/203 |
| 5,386,494 * | 1/1995 | White | 381/41 |

FOREIGN PATENT DOCUMENTS

| | | | |
|---|---|---|---|
| 2161755 * | 1/1986 | (GB) | 345/163 |
| 2244546 * | 12/1991 | (GB) | 345/161 |

OTHER PUBLICATIONS

International Conference on Speech Input/Output, IEE Conference; Alastair D.N. Edwards, pp. 154–157; Mar. 1986.*

Mouse with Ears, Anonymous Author, Research Disclosure, Dec. 1991, No. 332; Kenneth Mason Publications Ltd, England.*

IBM Independence Series Voicetype User's Guide 1991; pp 28–41 and 60–77.*

* cited by examiner

Primary Examiner—Regina Liang

(57) ABSTRACT

A hand held data entry controller includes a chassis having a handle portion which is shaped to fit in the user's hand, and a cursor controller, such as a track ball, attached to the chassis for providing a signal representative of a desired cursor position on a display screen. In another embodiment, the data entry device further includes at least one command button for providing a command signal representative of a desired command. The data entry device may also include a microphone attached to the chassis for providing an acoustic speech signal representative of a user's speech. In this embodiment, the device may also include a voice command button, attached to the chassis, for providing, in response to a user's input, a command signal indicating whether the acoustic speech signal represents a spoken command.

3 Claims, 4 Drawing Sheets

DATA ENTRY DEVICE

This is a continuation of application Ser. No. 08/029,118, filed Mar. 10, 1993 now abandoned.

BACKGROUND OF THE INVENTION

The invention relates generally to data entry into a computer.

An operator of a computer typically enters data into a computer by typing the data on a keyboard attached to the computer. Some computers also include a microphone which provides the computer with an electrical representation of a user's voice. Such computers may include voice recognition software for converting the electrical representation of the user's voice to text. See for example, U.S. Pat. No. 5,036,539 entitled "Real Time Speech Processing Development System"; and U.S. Pat. No. 5,005,203 entitled "Method Of Recognizing Continuously Spoken Words", both of which are incorporated herein by this reference.

The object of the present invention is to provide an improved data entry device.

SUMMARY OF THE INVENTION

In general, the invention relates to a handheld data entry controller. The data entry controller includes a chassis having a handle portion which is shaped to fit in the user's hand, and a cursor controller, such as a track ball, attached to the chassis for providing a signal representative of a desired cursor position on a display screen.

In another embodiment, the data entry device further includes at least one command button for providing a command signal representative of a desired command.

The data entry device may also include a microphone attached to the chassis for providing an acoustic speech signal representative of a user's speech. In this embodiment, the device may also include a voice command button, attached to the chassis, for providing, in response to a user's input, a command signal indicating whether the acoustic speech signal represents a spoken command.

This device allows the user to enter data and commands to a computer using a convenient hand held device. Other objects, features and advantages of the invention are apparent from the following description of preferred embodiments taken together with the drawings.

DESCRIPTION OF THE PREFERRED EMBODIMENT

Figure 1:
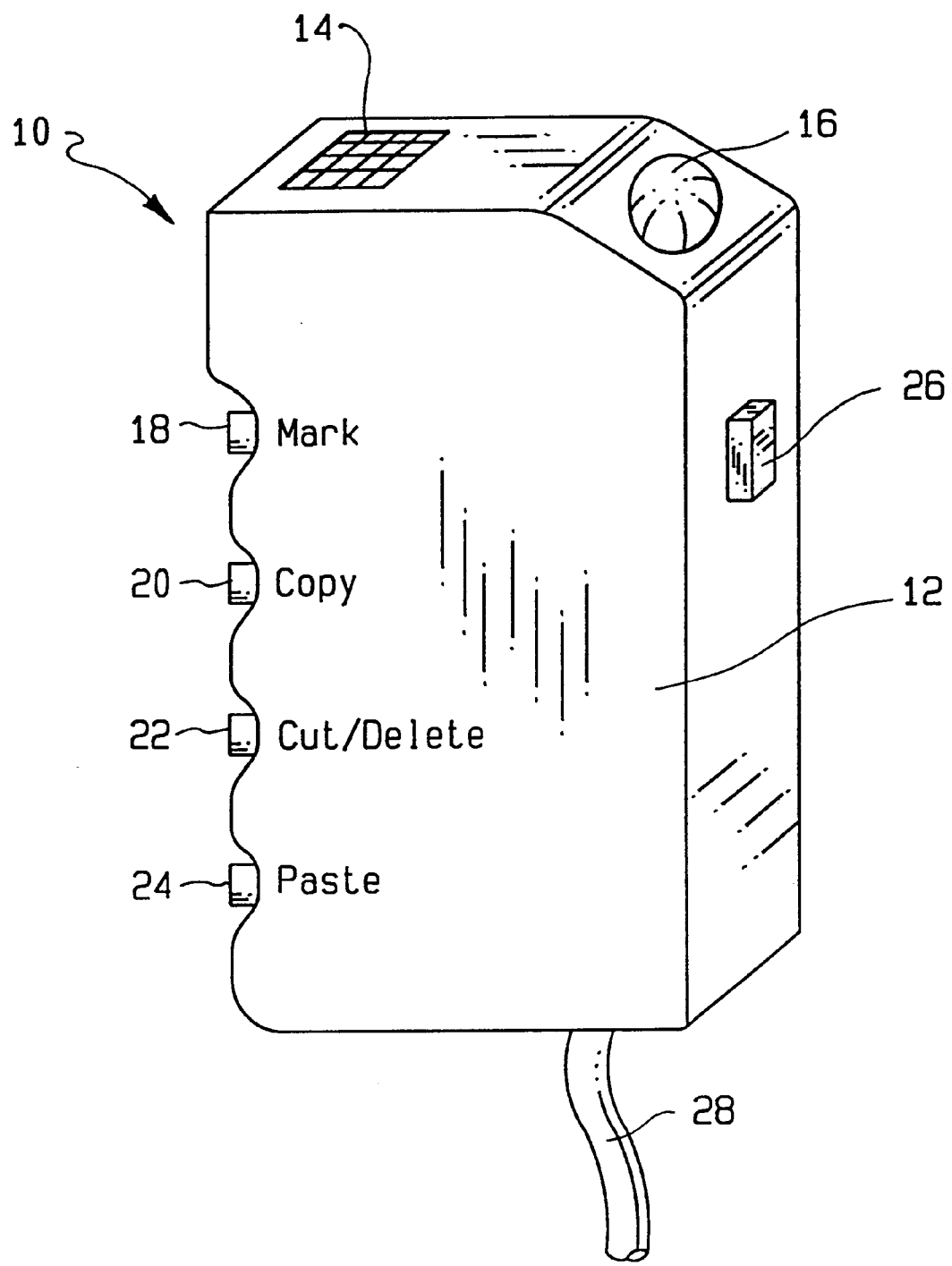
FIG. 1 is an illustration of a hand held data entry device having a microphone, a cursor controller, and several command switches.
Figure 4:
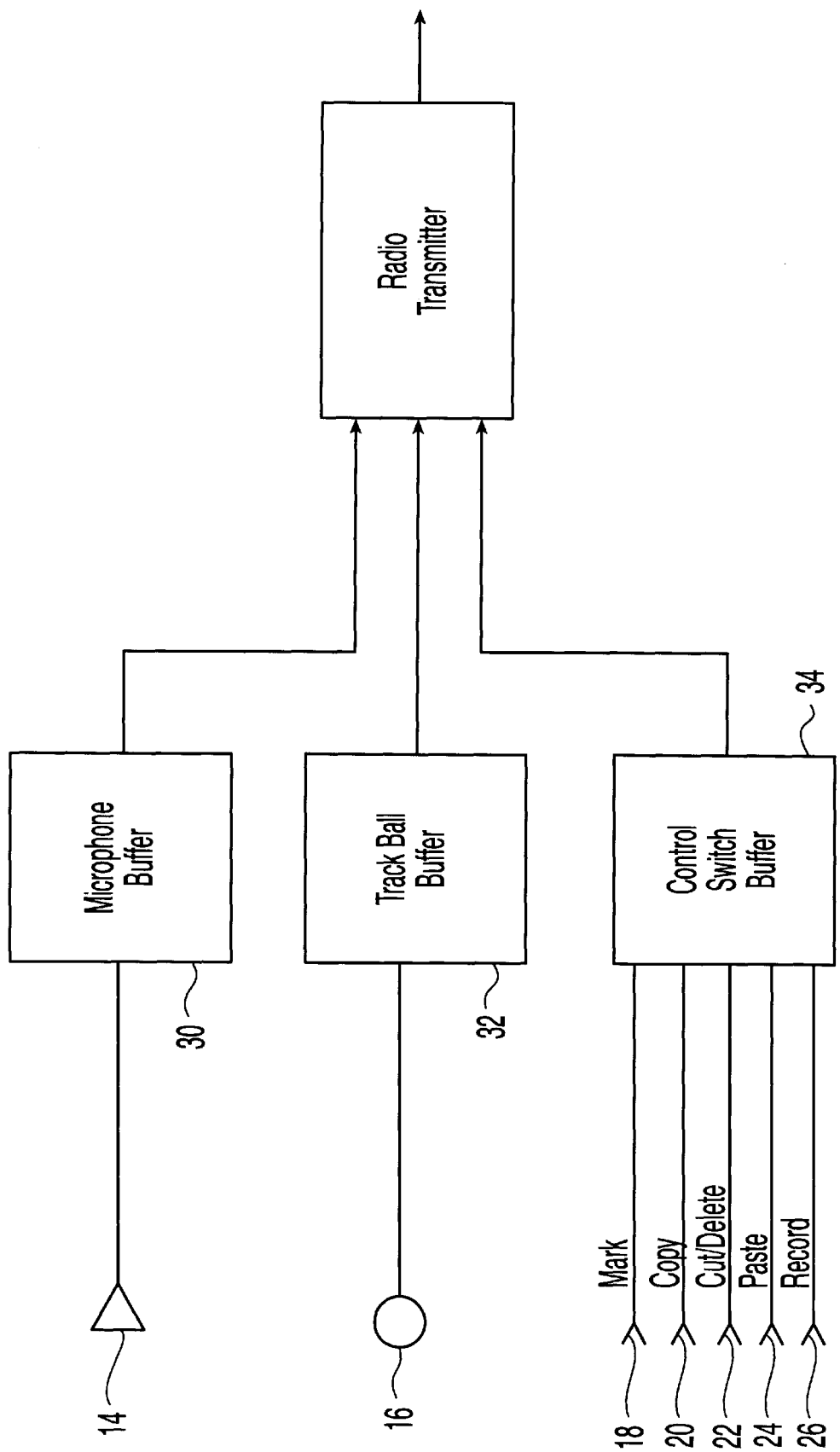
FIG. 4 is a block diagram of the data data entry device shown in FIG. 1, having a wireless transmitter.

Referring to FIG. 1, a hand held data entry device 10 includes a chassis 12. The chassis supports several input transducers 14–26 for receiving data and commands from an operator. A transmission cable 28 is connected between the data entry device and a processing device (herein "computer"). The data entry device transmits data and command signals over the transmission cable to the computer. In an alternative embodiment shown in FIG. 4, the data entry device includes a radio transmitter 36 for transmitting the data and commands to the computer without the need for a transmission cable.

The input transducers include a microphone 14, a "track ball" device 16 and a set of buttons 18–26 (Buttons 18–26 can be electromechanical switches, membrane switches or any type of transducer known to those skilled in the art which can be used to accept a user's input).

Figure 2:
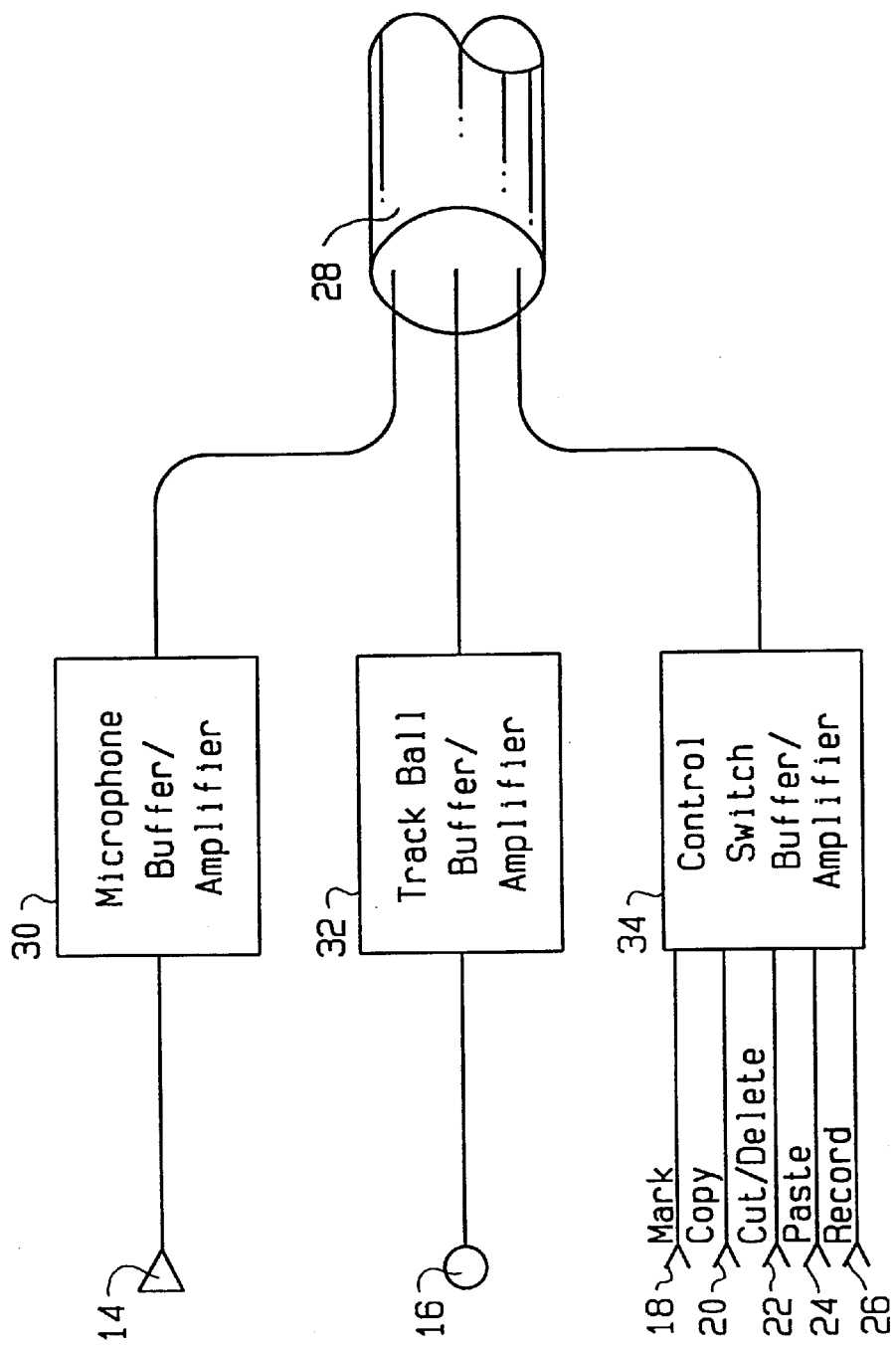
FIG. 2 is a block diagram of the data entry device shown in FIG. 1.

Referring to FIG. 2, microphone 14 generates an electrical signal representative of an acoustic speech signal. The microphone provides the electrical signal to a microphone buffer/signal amplifier 30. The buffer/amplifier 30 amplifies the microphone signal and transmits the amplified signal over transmission cable 28 to the computer.

The computer includes an analog-to-digital converter for converting the transmitted signal to a series of digital samples representative of the transmitted signal. In an alternative embodiment, an analog to digital converter is housed within the chassis. In this embodiment, the data entry device transmits the digital signal to the computer for storage in the computer's memory. In either case, the computer includes speech recognition software for converting the digital samples to text. The text is then displayed on the computer's screen for viewing by the user. The computer further includes text editing software for allowing the user to modify the text displayed on the screen.

The track ball 16 generates electrical signals ("track ball signals") representative of the rotation of the ball by a user. A track ball input buffer/amplifier 32 transmits the track ball signals to the computer. In response, the computer moves a cursor on the display screen to a location determined by the track ball signals. Thus, the user can direct the cursor to a desired location on the computer screen by manipulating the track ball while viewing the screen. Other types of input transducers can be used to manipulate the cursor, such as well known cursor control keys.

The buttons 18–26 are connected to control switch buffer/amplifier circuitry 34 which produces electrical signals representative of whether the buttons are asserted. The electrical signals are transmitted to the computer over cable 28 to notify the computer that one or more keys have been asserted.

Each of the above described input transducers are well known to those skilled in the art. However, as explained more fully below, they cooperate when housed in a chassis to provide the user with a convenient, hand held input device for entering a variety of input data.

To begin recording dictation, the user asserts the record button 26 and begins speaking into the microphone. Control switch buffer/amplifier 34 transmits a signal to the computer to indicate that the record button has been asserted. Microphone buffer/amplifier 30 transmits a microphone signal representative of the user's voice. As explained above, the signal is either an analog signal or, in embodiments in which an A/D is housed within the data entry device, a digital signal. In response, the computer begins storing digital samples of the microphone signal in a memory. To terminate dictation, the user releases the record button 26.

The computer includes speech recognition software which analyzes the stored samples and prepares therefrom a document containing a textual transcript of the speech. The transcript document is displayed on the computer's display screen for viewing by the user.

To modify the transcript document, as for example if the speech recognition software mis-transcribed the speech, the user first moves the "cursor" on the computer display screen to the location within the text which requires editing. Toward this end, he manipulates the track ball as described above. The track ball is housed in the same handheld chassis which houses the microphone and is conveniently positioned beneath the user's thumb. Accordingly, the user need not release the microphone to operate a separate cursor control mechanism. Rather, he simply manipulates the track ball with his thumb to direct the cursor to the desired location.

Once the cursor is in place, the user can insert new text at the selected location by asserting the record button and speaking into the microphone as described above.

He can also delete the text adjacent to the cursor by pressing the "cut/delete" button 22. The cut/delete button is housed in the same chassis as the microphone and track ball and is conveniently positioned beneath (or within the reach of) one of the user's fingers.

Alternatively, the user can assert a combination of buttons 18–24 as described below to select and manipulate blocks of text. First, to mark or "select" a block of text, the user positions the cursor to a desired location using the track ball. He then asserts the "mark" button 18 to notify the computer that the current cursor position marks the beginning of a selected block of text. He then repositions the cursor to a new position and reasserts the mark button to notify the computer that the new cursor location marks the end of the block.

After selecting the block of text, the user can assert the "cut/delete" button 22 to instruct the computer to remove the selected text from the document. If the user wishes to replace the text at a different location in the document, he repositions the cursor to the desired location and presses the "paste" button 24. In response, the computer inserts the selected text into the document at the cursor position.

Similarly, the user can copy selected text to a new location without deleting the selected text. Toward this end, the user selects a block of text as describe above and then asserts the "copy" button 20. This instructs the computer to copy the selected block of text without deleting it from its current location. The user then moves the cursor to the desired location and asserts the paste button to instruct the computer to copy the text to the selected location.

All of the above described buttons 18–26 are housed in the same chassis as the microphone and track ball and are conveniently located beneath (or within reach of) one of the user's fingers. Accordingly, the user can dictate text into the computer, move the cursor on the computer's display screen and manipulate the text, all with the same handheld device. Thus, the user need not release the device and move his hands to another input device to perform the above described functions.

Figure 3:
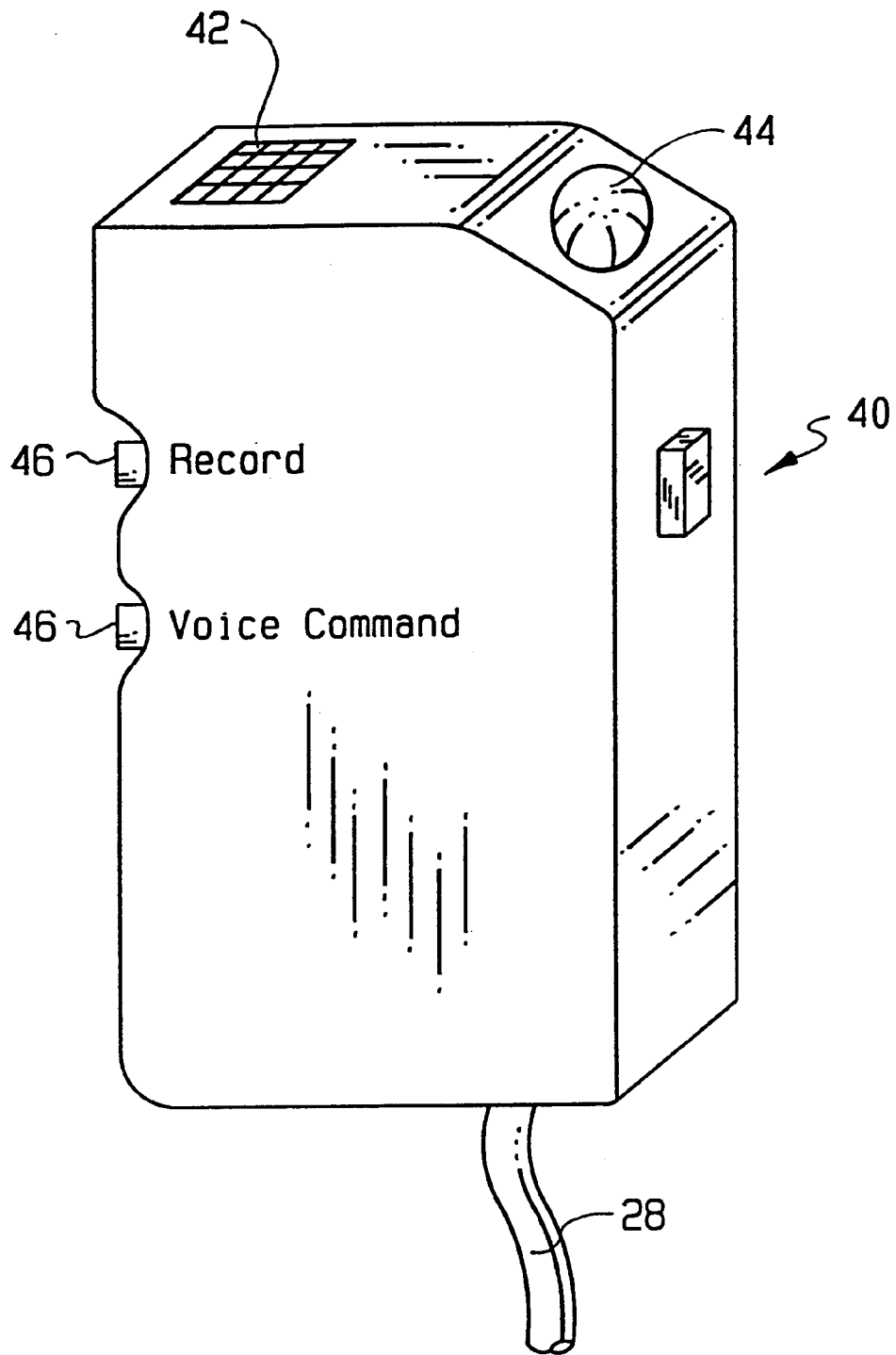
FIG. 3 is an illustration of a hand held data entry device for receiving spoken commands and data.

FIG. 3 illustrates a data entry device 40 for allowing a user to dictate commands rather than actuating buttons representative of these commands. Data entry device 40 includes a microphone 42, a track ball 44, and a record button 46 which operate identically to microphone 14, track ball 16 and record button 26 of the above described embodiment. Data entry device 40 also includes a voice command button 48 which, when asserted, causes the data entry device to transmit a voice command signal over cable 28 to notify the computer that the microphone signal represents a spoken command. For example, the user may assert the voice command button 48 and speak the word "mark" into the microphone. Since the voice command button was asserted, the computer examines the microphone signal to identify the spoken command. Upon recognizing the command "mark", the computer performs the same operation as performed when the mark button 18 of the previous embodiment was asserted. Similarly, the computer can be programmed to recognize other spoken commands such as the "copy", "paste" and "cut/delete" commands described above in connection with the embodiment shown in FIG. 1.

The embodiment shown in FIG. 3 includes a track ball for entering cursor control commands. However, the track ball could be replaced by spoken cursor control commands such as "cursor right", cursor left "cursor up", and "cursordown".

While the invention has been described in conjunction with preferred embodiments, it is evident that numerous alternatives, modifications, variations and uses will be apparent to those skilled in the art in light of the foregoing description.

What is claimed is:

1. A data entry system comprising a handheld peripheral and a processing system, wherein
said handheld peripheral comprises:
a microphone for providing a microphone signal representative of a user's voice,
a voice command button for providing a command notification signal indicating whether said voice command button is asserted,
a voice data button for providing a data notification signal indicating whether said voice data button is asserted,
a cursor position transducer for providing a cursor signal representative of a desired cursor position on a display screen of said processing system, and
a coupling mechanism for providing said microphone signal, said command notification signal, said data notification signal, and said cursor signal to said processing system; and wherein
said processing system comprises:
said display screen, and
microphone interpretation mechanism which, in response to said command and data notification signals, determines when said microphone signal represents command and when it represents data.

2. The data entry system of claim 1 wherein said processing system further comprises a speech recognition mechanism which generates text data representative of a microphone signal designated as data by said interpretation mechanism.

3. The data entry system of claim 1 wherein said coupling mechanism includes a transmitter which transmits said microphone signal, said command notification signal, said data notification signal, and said cursor signal to said processing system without using a transmission cable.

* * * * *